United States Patent [19]

Myslinski et al.

[11] Patent Number: 5,530,584
[45] Date of Patent: Jun. 25, 1996

[54] CONTROL OF GAIN AND DISPERSION OF A SIGNAL IN AN OPTICAL MEDIUM

[75] Inventors: Piotr Myslinski; Jacek Chrostowski, both of Gloucester, Canada

[73] Assignee: National Research Council of Canada, Ottawa, Canada

[21] Appl. No.: 357,649

[22] Filed: Dec. 16, 1994

[51] Int. Cl.⁶ .................................................. H01S 3/00
[52] U.S. Cl. ............................................................ 359/341
[58] Field of Search ................................. 359/341; 372/6

[56] References Cited

U.S. PATENT DOCUMENTS 5,117,303  5/1992  Desurvire et al. ................... 359/341
5,177,634  1/1993  Way .................................... 359/341
5,363,234  11/1994  Newhouse et al. ................ 359/341
5,379,148  1/1995  Blondel et al. .................... 359/341

*Primary Examiner*—Mark Hellner
*Attorney, Agent, or Firm*—Neil Teitelbaum and Associates

[57] ABSTRACT

By using a pumped erbium doped fibre (EDF) cascaded with a non-saturable absorbing fibre (NSAF), an amplifier is provided with a desired flat uniform output response for a input signals with different intensities at a plurality of wavelengths. Furthermore, from a commercial standpoint, the amplifier is relatively inexpensive and simple to fabricate, being compatible with standard telecommunication fibre. With this particular invention, a previously recognized undesired characteristic of NSAF, its poor amplification qualities, are now being used to an advantage.

18 Claims, 15 Drawing Sheets

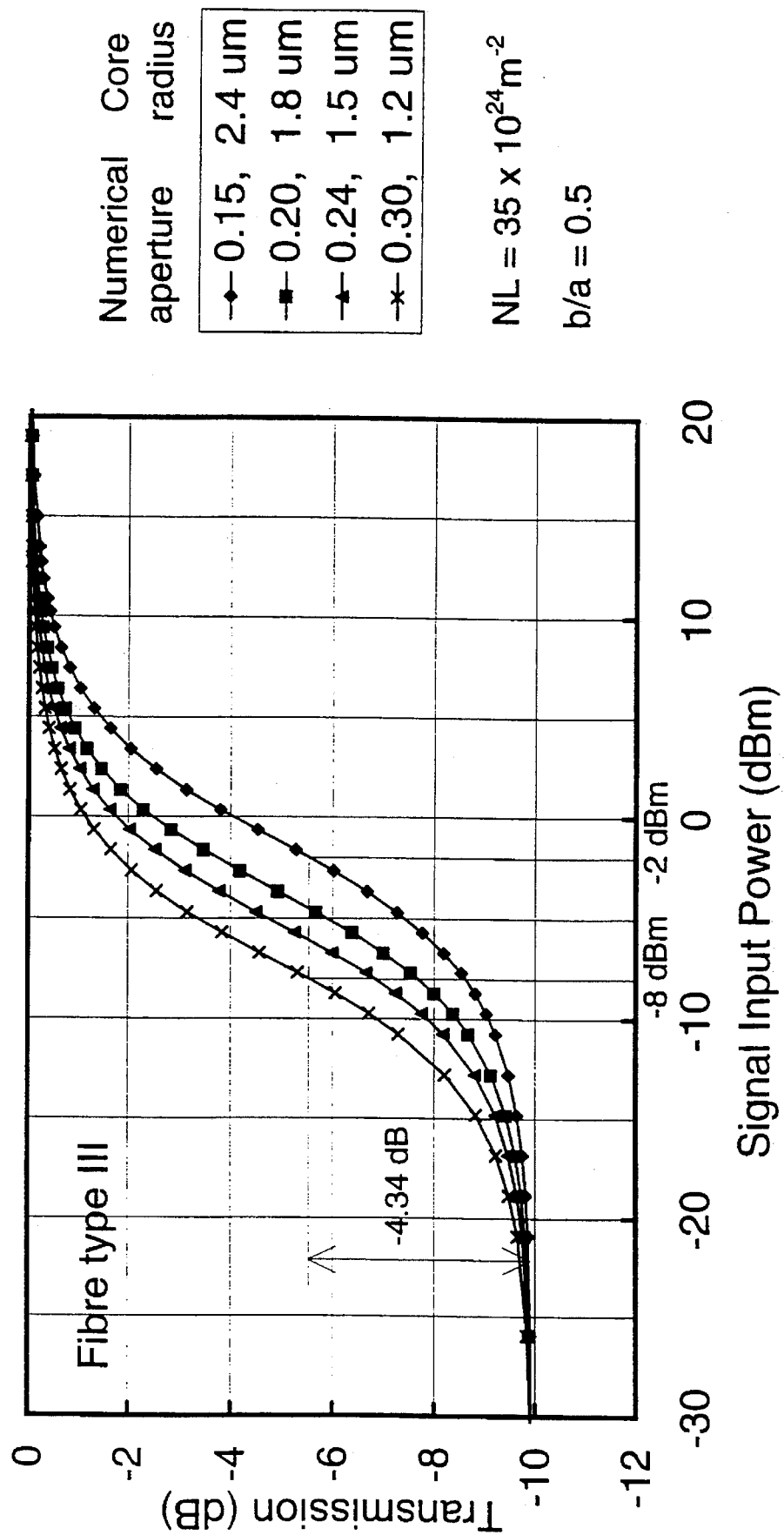

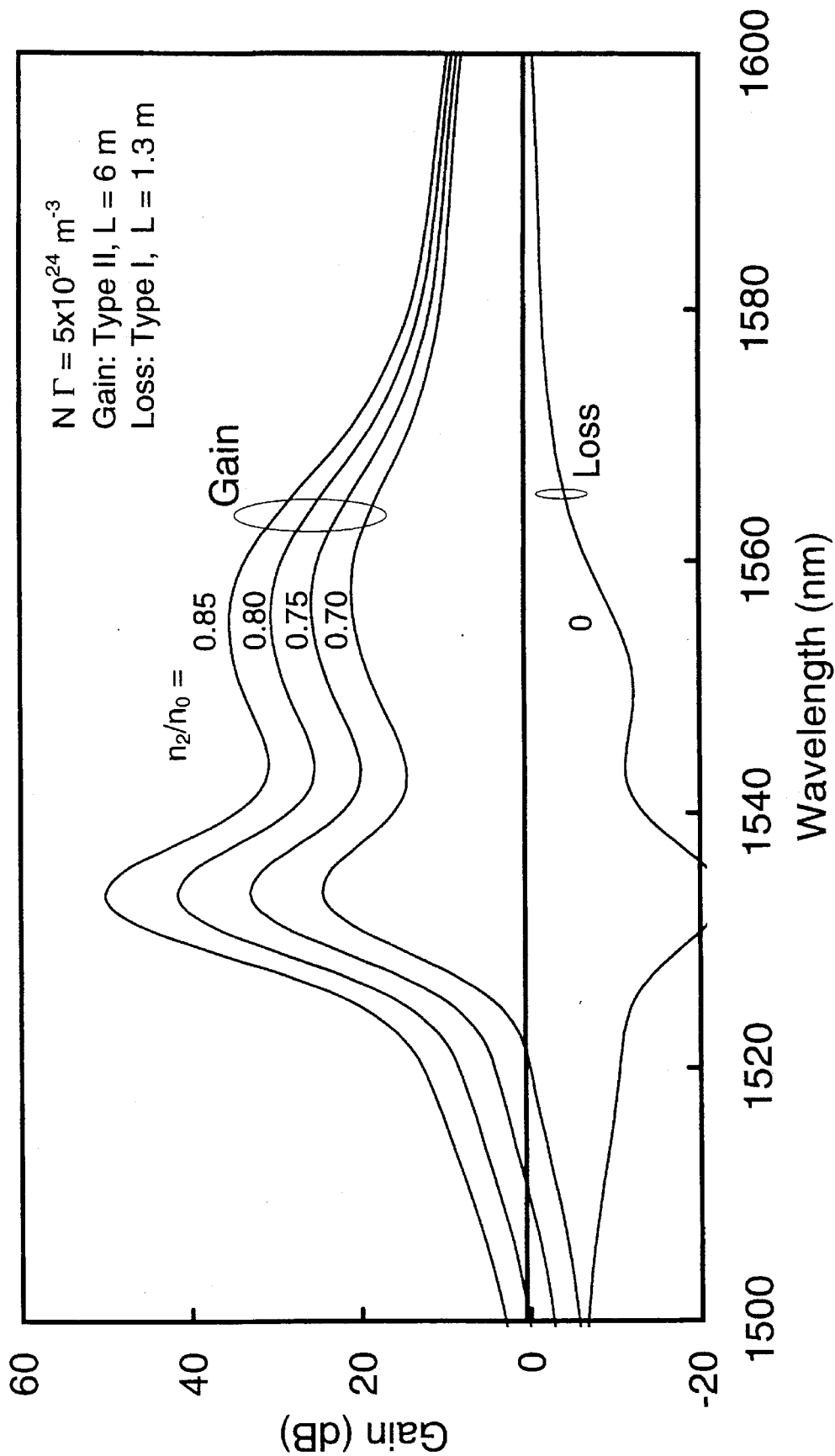

CONTROL OF GAIN AND DISPERSION OF A SIGNAL IN AN OPTICAL MEDIUM

FIELD OF THE INVENTION

This invention relates generally to rare-earth doped optical waveguides and to a method of controlling the dispersion, absorption and amplification of a signal in an optical medium. More particularly, the invention relates to a device and method for controlling amplification, dispersion, and absorption of light energy at particular wavelengths.

BACKGROUND OF THE INVENTION

For some time, it has been known, that optical fibre in which the core is doped with particular substances, for example, rare-earth ions, has stimulated emission characteristics adapted to be used as laser sources and in optical amplifiers.

In fact, these fibres can be pumped with a light energy at a particular wavelength, that is capable of bringing the doped atoms to an excited emission, or metastable state in which state they remain for a relatively longer time.

When a fibre having a high number of atoms excited in the emission level is traversed by a light signal with a wavelength corresponding to such emission state, the light signal causes the stimulated transition of the excited atoms to a lower level and the light emission has the same wavelength, polarization and propagation direction as the input signal. Therefore, a fibre of this kind can be used to obtain optical signal amplification.

During the last several years, rare-earth doped optical fibre amplifiers, and more particularly, erbium-doped fibre amplifiers (EDFAs) have had a major impact in the field of lightwave communications. Their high gain, high power, and low noise has made them advantageous over electronic repeaters used in some optical fibre systems. As well their data modulation format, data bit rate, and insensitivity to input light polarization makes them a preferred choice for many optical systems.

However, one limitation of any rare-earth doped optical fibre amplifier is unequal gain over a range of frequencies or optical channels of interest, as well as for various input signal strengths (i.e. different saturation levels). Over a 35 nanometer gain bandwidth, erbium doped fibre amplifiers (EDFAs) typically exhibit a 10 to 15 dB small-signal gain variation. This variation becomes smaller when the amplifier operates in the saturated region; the gain variation almost completely vanishes and is typically smaller than 1 dB for a fully saturated amplifier. Therefore an ideal gain equalization circuit is preferably active in its characteristics, accommodating to the variable saturation level of the operating EDFA. In long chains of cascaded EDFAs small spectral gain variation can result in unacceptable large difference in received optical power and therefore, it is preferable to lessen even small spectral variation in gain.

To date, several gain equalization and flattening techniques have been proposed and described in a variety of prior art references. For example, gain clamping with enhanced inhomogeneous saturation is described by V. S. da Silva et al in Proc. OFC'93. paper THD2, P.174, 1993. One of the limitations of this method is the requirement that fibre be cooled to 77K. The use of passive internal/external filters has been explored by M. Tachibana, et al in IEEE Photonics Technol. Lett. 3, no. 2, 118, 1991, by M. Wilkinson et al. in Electron. Lett. 28, no. 2, p. 131, 1992, and by Kashyap et al in Electron. Lett. 29, no. 2, P. 154, 1993, and as well by Grasso et al, in Proc. OFC'91, paper FA3, p. 195, 1991. Another attempt to provide a doped optical fibre amplifier that is suitable for use over a range of frequencies is described in U.S. Pat. No. 5,245,467 entitled Amplifier with a Samarium-erbium Doped Active Fibre, issued Sep. 14, 1993 in the name of Grasso et al. Although the invention described in the patent works well at particular wavelengths and for particular signal strengths, it has been found to be limited at other wavelengths. However, the major limitation with most of these devices and methods is the requirement for bulk optics and non-standard components. The use of external active acousto-optic filters has been explored by S. F. Su et. al in IEEE Photonics Technol. Lett. 4, no. 3, p. 269, 1992; the drawback with this proposal is that it requires bulk optics, is complex in design, and has high loss.

One reference that attempts to overcome some of the problems inherent in rare-earth doped optical amplifiers is U.S. Pat. No. 5,050,949 entitled Multi-stage Optical Amplifier, in the name of DiGiovanni et al., issued Sep. 24, 1991. In this invention, a multi-stage optical fibre amplifier for providing gain equalization is disclosed. The amplifier comprises at least two stages of amplification where each stage comprises an amplifying fibre having a different gain spectrum. In one embodiment, the two stages, which can be pumped separately, have different dopant compositions to provide each stage with a different gain spectrum. Although DiGiovanni's solution may be adequate in some instances and for specific frequency ranges, equalization is limited to a relatively narrow bandwidth. Another proposal for amplification equalization is spatial hole burning in twin-core fibre proposed by R. I. Laming et al in Proc. OFC'93, paper ThD3, p. 175, 1993. However, one of the drawbacks of this solution is that it is relatively complex to design these fibres and as well, the use of non-standard fibre make this solution less attractive than others. Another solution to that attempts to provide gain equalization is the adjustment of input signal powers. Unfortunately, this scheme requires prior knowledge of the wavelength and strength of the input signal. As well, a precise adjustment of input power at each wavelength is required.

In general, all of the aforementioned references are somewhat limited in that they perform adequately for signals of particular wavelengths and intensities, but do not respond adequately in a dynamic sense by adapting to input signals having varying wavelengths and intensities of to provide a relatively spectrally flat output response. All of the aforementioned amplification techniques do not adapt attenuation to various signal power levels and amplifier saturation properties; and, most of these techniques require bulk, optical components.

It is an object of the invention to provide a rare-earth doped amplifier that has a relatively flat input/output response for various signal power levels and at various wavelengths.

It is a further object of the invention, to provide an optical fibre amplifier that can be fused to and is compatible with conventional optical fibres.

STATEMENT OF THE INVENTION

In accordance with the invention, there is provided, an optical fibre amplifier comprising an optical fibre having a core being doped with ions of a rare-earth doping substance having a concentration of less than $20 \times 10^{24}$ ions/m$^3$, most of the ions being sufficiently spaced apart so that the ions will produce amplification of an input signal at predetermined wavelengths upon excitation by a light energy, the optical fibre core also being doped with ions some of which are of the same rare-earth in a concentration substantially greater than $50 \times 10^{24}$ ions/$m^3$, these ions being clustered and spaced so near to one another as to effect non-saturable absorption of at least part of the input signal.

In accordance with the invention, there is further provided an optical device comprising an fibre, a portion along its length being doped with ions of a rare-earth having a first concentration of less than a predetermined number of ions/$m^3$, most of the ions being sufficiently spaced apart so that the ions will produce amplification of an input signal at predetermined wavelengths upon excitation by an energy source, the optical fibre having another portion along its length being doped with ions, some of which are of the same rare-earth in a concentration substantially greater than the first concentration, the ions being clustered such that each cluster contains at least one ion of the same rare-earth, the clustered ions being spaced so near to one another as to effect non-saturable absorption of at least part of the amplified signal.

In accordance with the invention, there is further provided an optical device comprising:
  a first optical waveguide being doped with ions of a rare-earth for providing amplification with an efficiency close to quantum limits, a plurality of the rare-earth ions being spaced apart from each other so that the ions will produce amplification of an input signal at predetermined wavelengths when excited by an energy source; and
  a second optical waveguide coupled with the first optical waveguide, the second optical waveguide being more heavily doped than the first optical waveguide with ions, some of which are of the same rare-earth, the ions being spaced closer together in clusters or pairs so that they are spaced so near to one another as to effect non-saturable absorption of at least part of the amplified signal.

In accordance with another aspect of the invention, there is provided, an optical amplifier for amplifying an input optical signal of a first wavelength comprising:
  a pump source for providing a pump signal having a second wavelength;
  means for coupling the input optical signal with the pump signal;
  an erbium doped optical waveguide for producing amplification of the input optical signal in the presence of the pump signal propagating within the erbium doped optical waveguide;
  means for substantially removing any remaining pump signal having the second wavelength from an output end of the erbium doped optical waveguide;
  a non-saturable absorbing waveguide coupled to receive the input optical signal after it has been amplified by the erbium doped optical fibre, said non-saturable absorbing waveguide, attenuating at least some of the input optical signal after it has been amplified.

In accordance with an aspect of the invention there is provided, an optical device comprising a first optical waveguide being substantially doped with single ions of a rare-earth for providing amplification with an efficiency close to quantum limits, a plurality of the rare-earth ions being spaced apart from each other so that the ions will produce amplification of an input signal at predetermined wavelengths when excited by an energy source; and a second optical waveguide coupled with the first optical waveguide, the second optical waveguide being more heavily doped than the first optical waveguide with rare-earth ions formed in clusters of ions, the clusters each being formed of ion groups large enough to cause intensity independent non-saturable absorption.

In accordance with the invention there is yet further provided, an optical device comprising waveguide means having a first portion and second portion, one of the first and second portions being comprised of a rare-earth doped optical fibre amplifier, and the other of the first and second portion being comprised of a rare-earth doped non-saturable absorbing optical fibre.

BRIEF DESCRIPTION OF THE DRAWINGS

Exemplary embodiments of the invention will be described in conjunction with the drawings, in which:

FIG. 1a is a graph of cross-section versus wavelength for type I optical fibre;

FIG. 1b is a graph of cross-section versus wavelength for type II optical fibre;

FIG. 1c is a graph of cross-section versus wavelength for type III optical fibre;

FIG. 2 is a graph of transmission versus signal input power at a wavelength of 1530 nm for type III optical fibre for particular numerical apertures and core radii;

FIG. 10a is a graph of gain versus wavelength showing intensity independent gain equalization using a type II optical fibre doped for gain and type I optical fibre doped to provide controlled loss in accordance with this invention;

FIG. 10b is a graph of gain versus wavelength depicting total intensity independent gain after gain equalization shown in FIG. 10a;

FIG. 11a is a graph of gain versus wavelength showing intensity dependent gain equalization using a type II optical fibre doped for gain and type I optical fibre doped to provide controlled loss in accordance with this invention; and, FIG. 11b is a graph of gain versus wavelength depicting total gain after intensity dependent gain equalization shown in FIG. 11a.

DETAILED DESCRIPTION

Recently, R. S. Quimby, W. J. Miniscalco, and B. Thompson, in a paper entitled Fibre Laser Sources and Amplifiers IV, SPIE vol. 1789, p. 50, 1992; and, J. Nilsson, B. Jaskorzynska, and P. Blixt, in Proc. Topical Meeting on Optical Amplifiers and Applications, MD19-1, p. 222, 1993, have shown that in heavily doped optical fibres, a large portion of erbium ions reside in close proximity, in pairs or larger clusters of ions. These ions grouped in clusters interact with each other in a different way than homogeneously distributed dopants and cause "cluster induced excitation quenching" (CIEQ), that results in non-saturable absorption. Therefore, fibres with CIEQ can be only partially bleached, thus contrary to commonly used erbium doped fibres, they cannot become transparent under typical light power levels of less than 1 watt. Although these non-saturable absorbing fibres (NSAFs) are known to be poor amplifiers, and attempts have been made to lessen the number of clusters in optical fibre, this invention makes use of NSAFs non-saturable absorption characteristic in combination with saturable amplifying rare-earth doped optical fibre in a controlled manner so as to provide amplification with a relatively spectrally flat output response.

For a complete understanding of the present invention, some background description relating to the dependence of fibre transmission (absorption or amplification) on signal wavelength and on signal and/or pump power, follows.

Figure 1A:
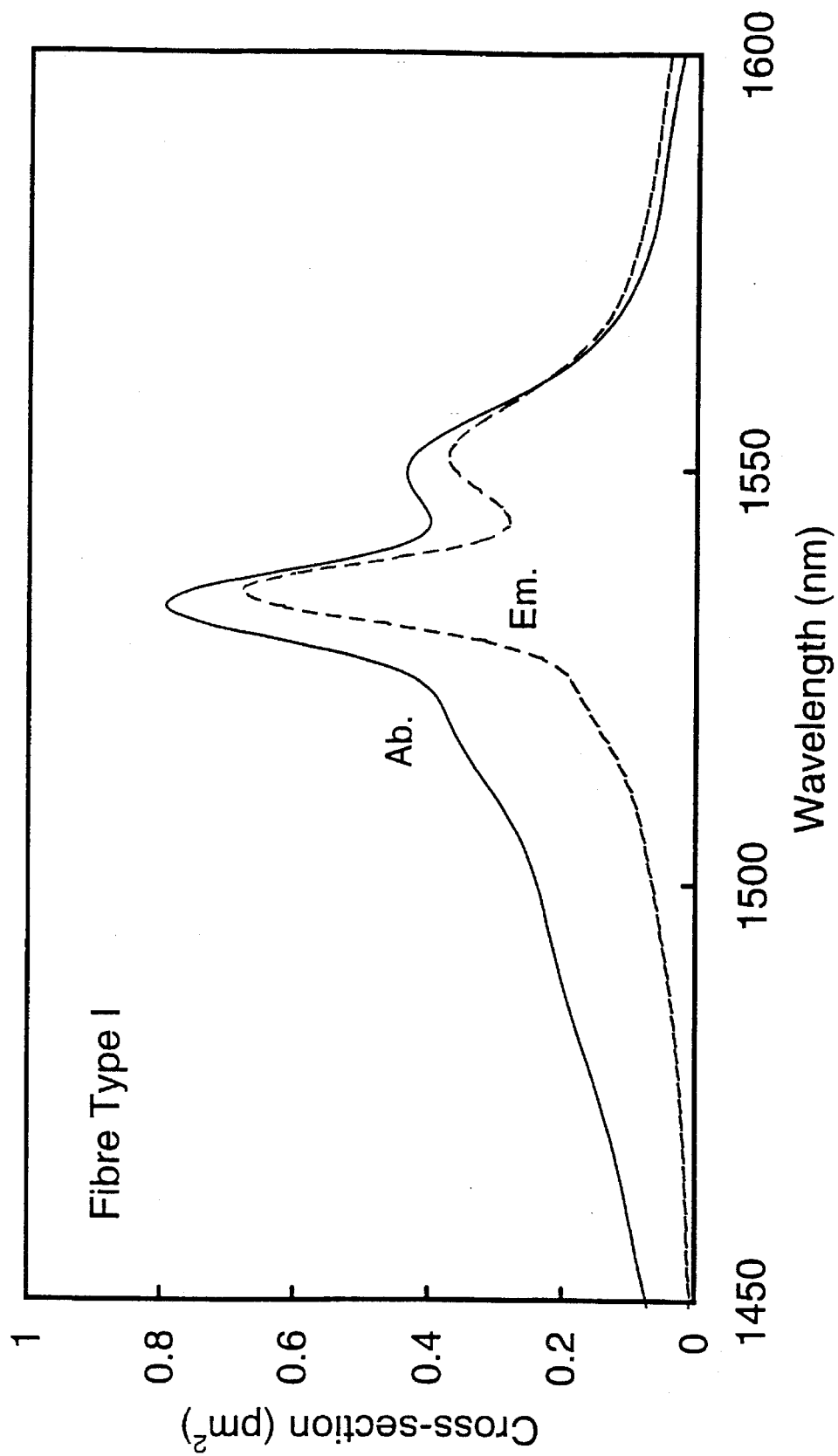
FIGS. 1a–1c are graphs illustrating the dependence of absorption/emission properties of erbium-doped optical fibres on co- dopants type and their concentration, and more specifically.
Figure 1B:
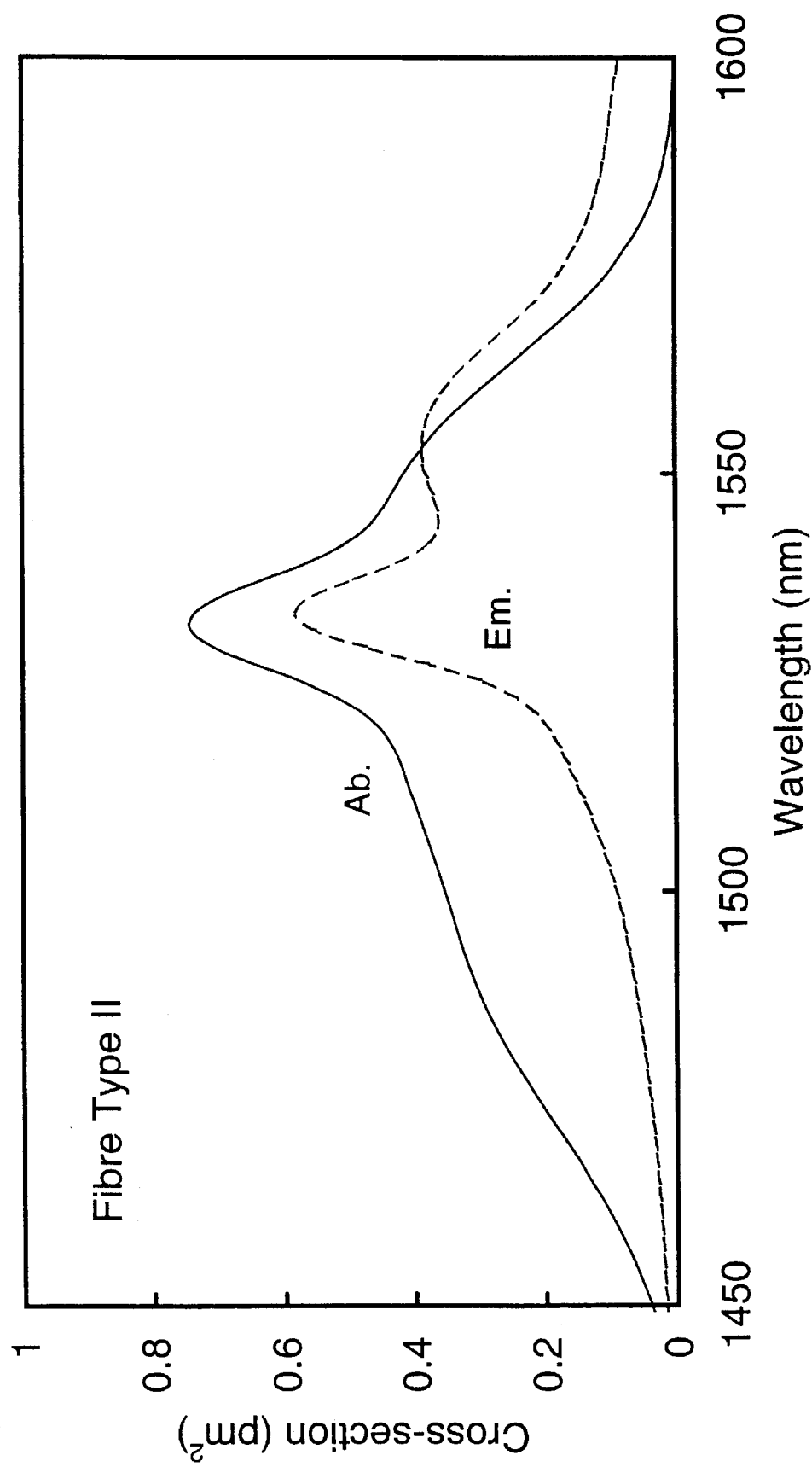
Figure 1C:
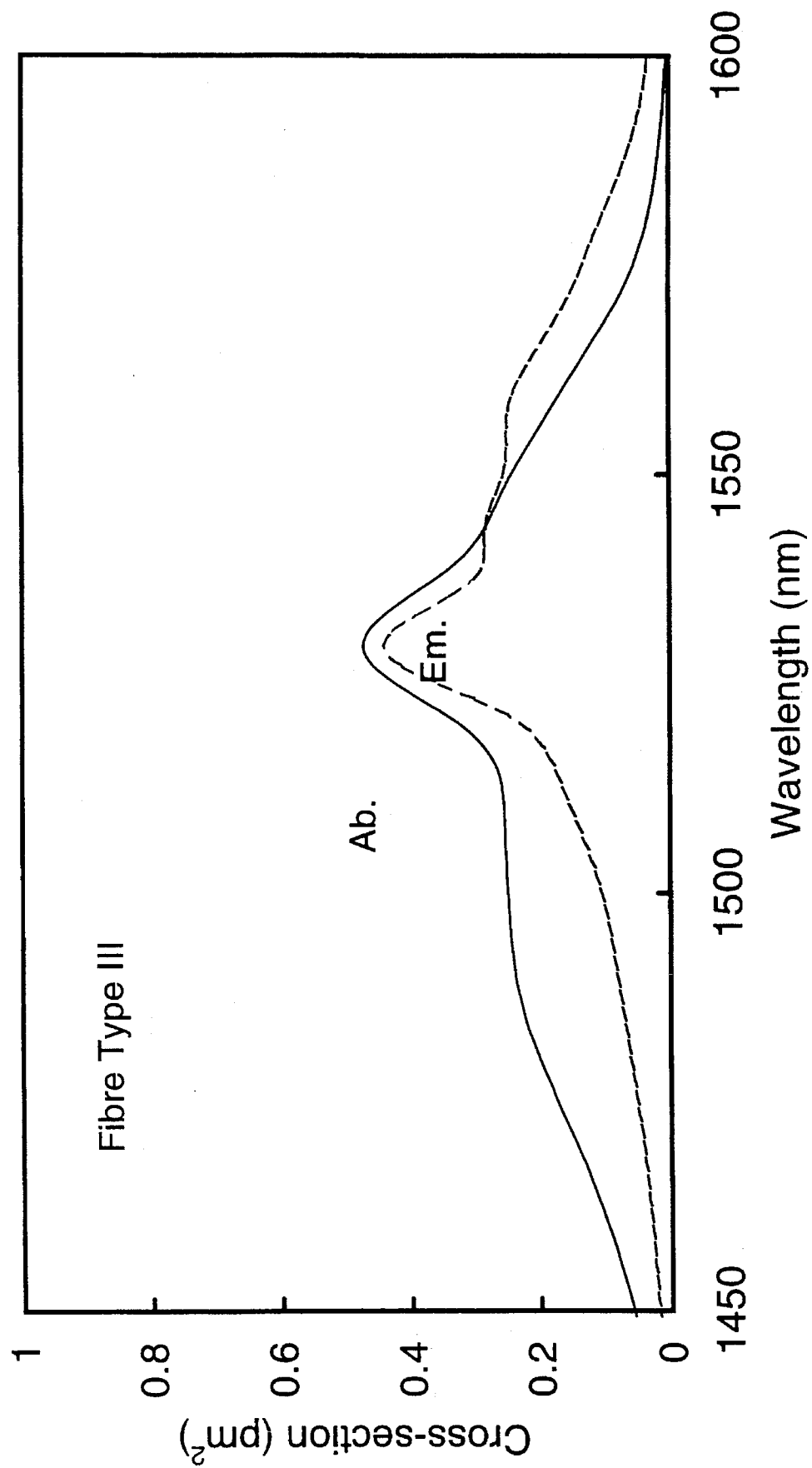

The absorption and emission spectra of three optical fibre types are shown in FIGS. 1a–1c respectively. The optical fibres relating to these figures differ in the type and concentration of co-dopants. These figures illustrate that the spectral amplitude and shape of the absorption (Ab.) and emission (Em.) characteristics of the optical fibres can be modified by the presence of various co-dopants.

Referring now to FIG. 2, a graph is shown of transmission versus signal input power at a wavelength of 1530 nm for a saturated type III optical fibre. The results, relating to an exemplary embodiment are modeled for the following optical fibre parameters:

single ion concentration: $N=51\times10^{24}$ m$^{-3}$ fibre length: L=0.685 m confinement factor b/a=0.5.

The selected parameters result in −10 dB small-signal absorption at 1530 nm. The vertical axis in the figures showing absorption (or gain) can be scaled linearly by varying ion concentration and/or fibre length. To simplify the description, the means by which the pump and signal beams are launched into the optical fibre are ignored, however means known to those skilled in the art, such as wavelength division multiplexors, optical fibre couplers, connectors, or laser diodes etc. may be envisaged. Only the effects of the 1530 nm signal and the 980 nm pump beams in the fibre are described. The physical phenomena in the following description are intended to be general and are not limited specifically to erbium ions and wavelengths of 1530 nm and 980 nm described in the exemplary embodiment.

Figure 3:
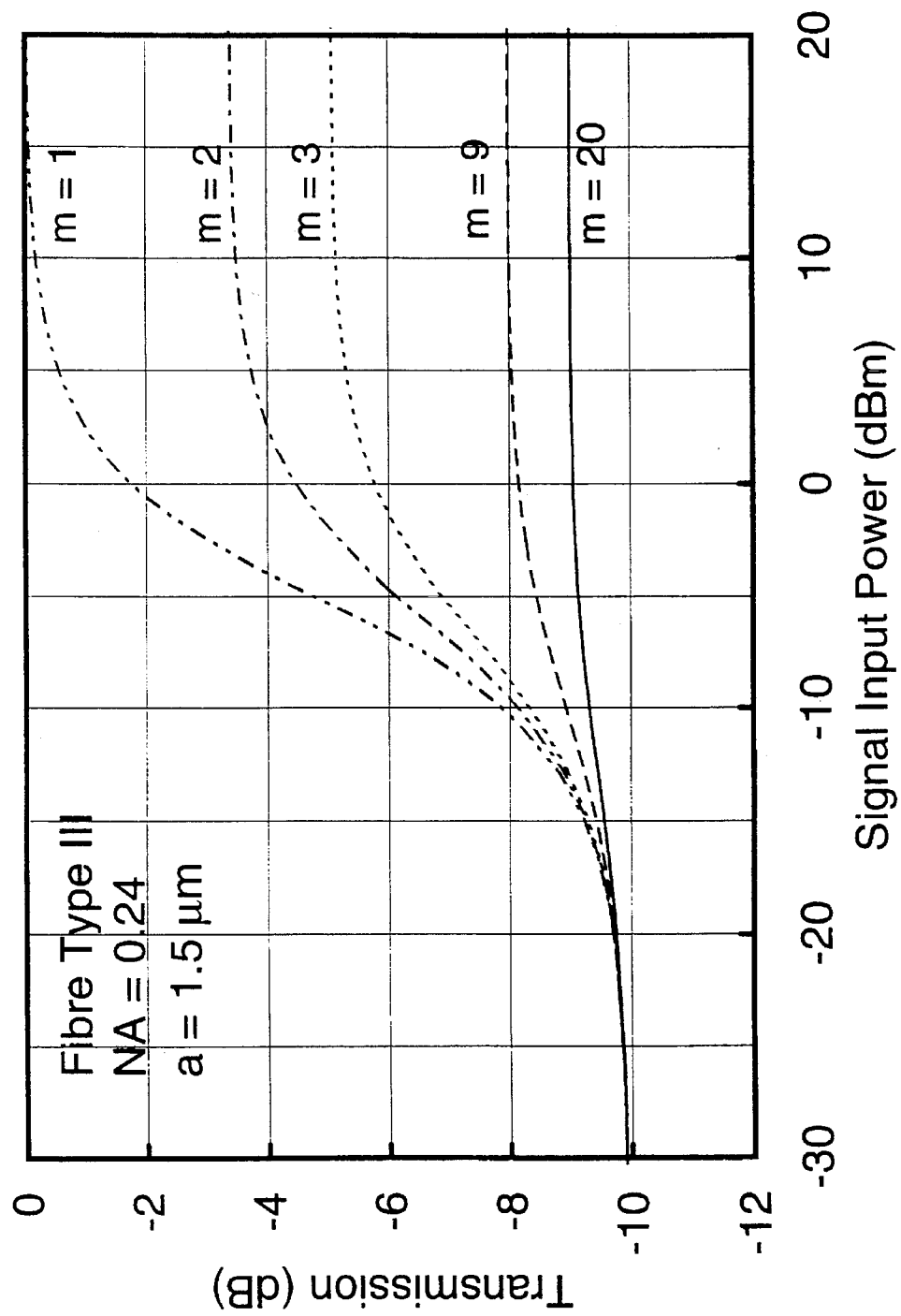
FIG. 3 is a graph of transmission versus signal input power at a wavelength of 1530 nm for type III optical fibre for clustered ions.

In FIG. 2, results are shown of a single beam experiment at 1530 nm for saturated transmission of optical fibre. Optical fibre transmission dependence on signal power for different fibre geometries is shown; for Type III optical fibre (see FIG. 1c), doped with single erbium ions, the saturation power can be designed in a range from −8 dBm (0.16 mW) to −2 dBm (0.63 mW). For the other fibre types the saturation power can be lessened, if required. Consequently, the small-signal absorption of −10 dB is saturated and bleached to almost full transparency with no absorption for input signals stronger than 10 dBm (10 mW). Output signal power over 10 mW is typical for commercially available EDFAs. Therefore unpumped optical fibres doped with single ions can not be used as passive absorption filters. When installed at the amplifier output, these optical fibres become bleached to full or nearly full transparency under typical conditions, and will not have any substantial effect. On the other hand, very different results are obtained using optical fibres with clustered ions. Referring now to FIG. 3, a similar experiment to that of FIG. 2 was performed for fibre type III with a numerical aperture NA=0.24 and core radius=1.5 μm. The only difference in the fibre of FIG. 3 is that all the ions reside in clusters, m ions in each cluster; The curve plotted for m=1 corresponds to single ion doping and is identical with a corresponding curve shown in FIG. 2 for NA=0.24 and core radius=1.5 μm. Standard, single ion doping (m=1) results in ordinary saturable absorption. On the other hand, clustered ions (m>1) cause non-saturable absorption, which can be controlled or varied by changing the number of ions in the cluster. In the extreme case, when ion clusters are large (m=20), the fibre behaves like a passive filter, and its absorption is almost independent of light intensity.

Figure 4:
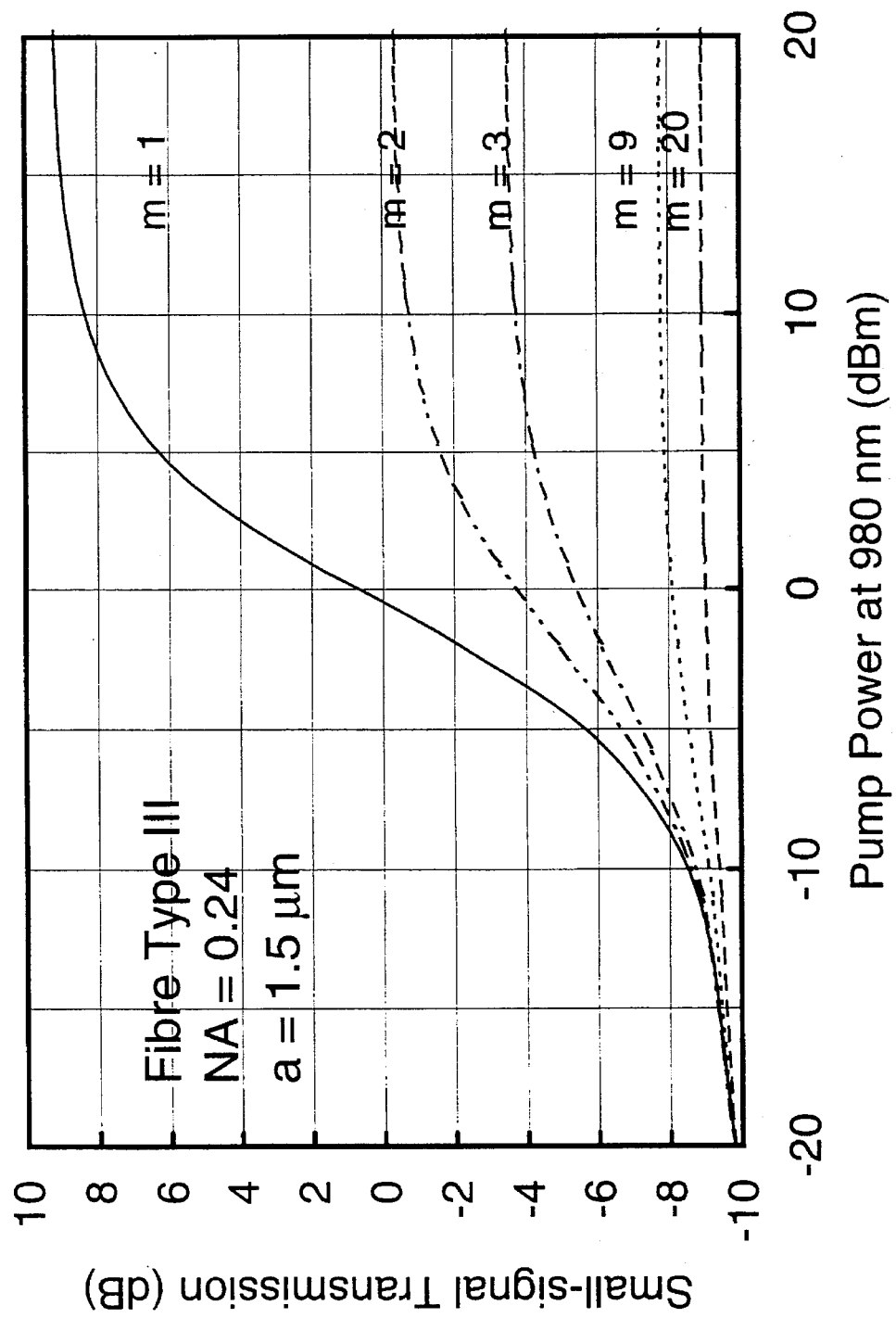
FIG. 4 is a graph of small-signal versus pump power transmission for ions being grouped in clusters of various size.

Population inversion $n_2/n_0$ (defined as the ratio of the total number of ions in the excited state, $n_2$, to the total number of ions, $n_0$) changes at 1530 nm wavelength from 0 to 0.5 for m=1, resulting in full absorption and bleaching from −10 dB to 0 dB. In the optical fibre with ion clusters the population inversion changes within much narrower range, from 0 to: 0.33 for m=2; 0.25 for m=3; 0.10 for m=9; 0.05 for m=20, etc. Consequently, ions remaining in the ground state cause non-saturable absorption. FIGS. 2 and 3 depict single beam experiments in which only absorption (negative transmission) of the signal at 1530 nm is observed. This absorption can be changed to amplification (positive transmission) when a second beam (pump) is present in the fibre as is presented in FIG. 4. FIG. 4 shows signal transmission using fibres with clusters for different pump powers. The dependence of a small-signal (i.e. very weak input signal) fibre transmission (absorption or gain) on the pump power is shown for an optical fibre with all the ions clustered. For m=1, −10 dB small-signal absorption is changed to almost +10 dB small-signal amplification at high pump powers. At the same time, the population inversion $n_2/n_0$ changes from 0 to 1. In the optical fibres with clustered ions (m>1), a significant degradation of signal gain is observed. In an extreme case for m=20, the optical fibre behaves as a passive filter and again, its absorption is almost independent on pump or signal power; see FIG. 3. The population inversion $n_2/n_0$ changes from 0 to: 0.5 for m=2; 0.33 for m=3; etc.

Figure 5:
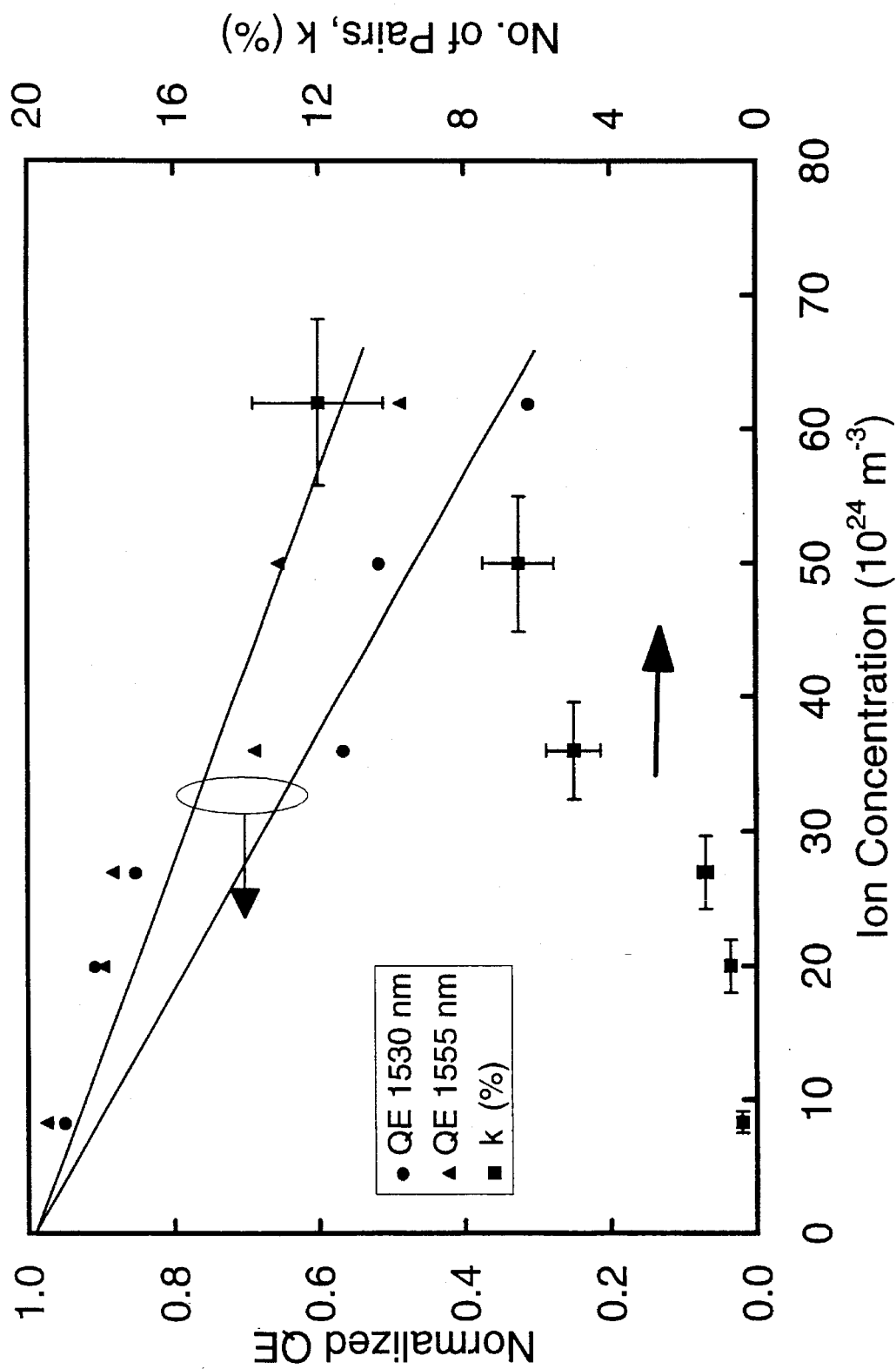
FIG. 5 is a graph of normalized quantum efficiency and number of ion pairs versus ion concentration, showing erbium doped fibre amplifier performance degradation due to ion pairs.

The degradation in performance of erbium doped fibre amplifiers due to the presence of clustered ions is observed experimentally in FIG. 5; in this figure, the degradation in performance due to the co-existence of paired ions and single ions can be seen. The number of ion pairs increases with concentration resulting in degradation not only of the EDFA gain but also of the quantum efficiency (QE). Quantum efficiency is the total number of pump photons at the fibre outputs divided by the total number of photons at the fibre inputs. Of course, if there is no loss in the fibre QE=1; conversely, if all the input photons are absorbed in the fibre and not emitted QE=0. When some loss occurs due to cooperative processes (e.g. upconversion) in ion clusters, background scattering, or impurity absorption there is a loss of photons and the QE is between 0 and 1. In a well designed EDFA having only single ions, the QE may reach 90%. FIG. 5 shows that even a small fraction of ions residing in clusters (20%, corresponding to k=10%) introduces a significant QE degradation (from 100% to 30%). This degradation is commonly observed in poorly performing amplifiers; therefore, ion clustering has to be avoided during fabrication of the fibres designed for efficient amplifiers. This is usually achieved by maintaining a low erbium concentration.

The following description will describe the effects induced by ion clusters. Single ions are far enough from each other that they do not strongly interact with one another. Therefore, single ions can be transferred to the excited state to deliver a maximum gain. On the other hand, clustered ions are close to one another and interact strongly. This interaction leads to cooperative energy transfer between excited ions known as up-conversion, that rapidly transfers part of the excited ions back to the ground state with an absence of photon emission. As a result, irrespective of the pump or signal power, part of the ions reside permanently in the ground state, causing non-saturable absorption. Consequently, even strongly pumped ions residing in clusters, partially occupy the ground state. The population inversion is only partial and the optical properties of the fibre are equivalent to that of the fibre with only single ions but under a low level of excitation.

The experiments described heretofore were performed at one signal wavelength of 1530 nm. However, the conclusions drawn are valid for all the wavelengths within the absorption/emission spectrum of erbium ions.

Figure 6:
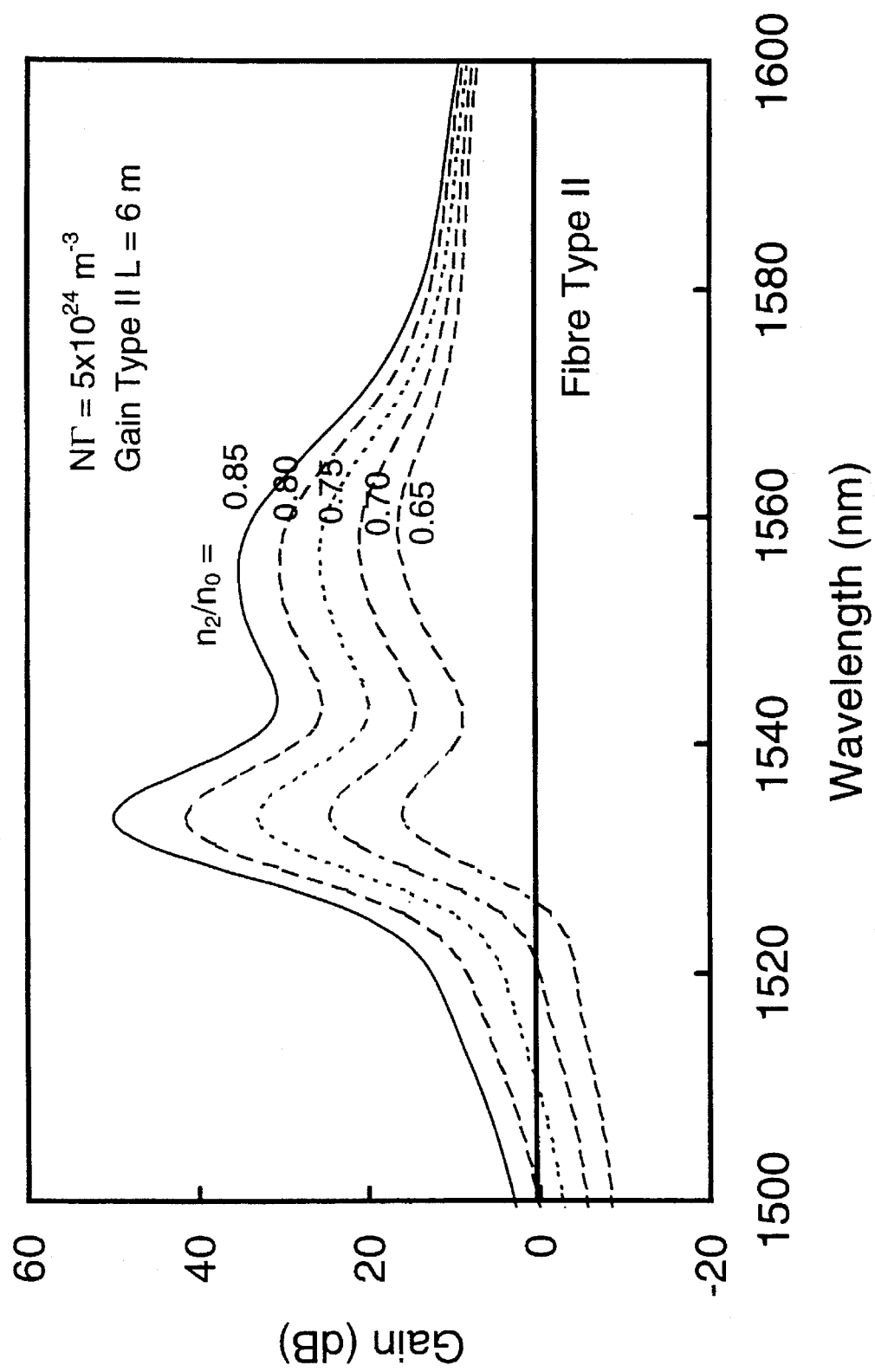
FIG. 6 is a graph of gain versus wavelength showing gain spectral dependence on population inversion for type II optical fibre.

In this invention the use the absorption properties of clustered ions allows substantial gain equalization in EDFAs. There have been two significant problems in using EDFA for multi-wavelength fibre optic applications: the small-signal gain characteristics of the amplifier are strongly dependent on wavelength; and the spectral shapes of this characteristic is dependent on the population inversion in the amplifier. The population inversion $n_2/n_0$ is in turn dependent on the signal and pump power, and the population inversion is thus a convenient parameter in describing the state of an amplifier without the need of specifying input and output optical signals. FIG. 6 illustrates dependence of the gain spectral characteristics on the population inversion. The gain of the optical fibre changes from about 10 dB for $n_2/n_0$=0.65 to about 40 dB for $n_2/n_0$=0.85. In the practical amplifier, the population inversion is around 0.6–0.9 and changes with the input signal power. Consequently, gain versus wavelength characteristics vary significantly. An amplifier built with a fibre having clustered ions offers the same gain characteristics as presented in FIG. 6, but with inversions significantly lower than 0.9 since some of the ions reside permanently in the ground state. Therefore, optical fibres with clustered ions do not offer any gain equalization features when used alone.

In this invention one or more pieces of erbium doped fibre with clustered ions characterized by different absorption/ emission spectra are introduced into an erbium doped amplifying fibre. In a well designed gain equalization system, using the principles of this invention, two conditions are met: (i) wavelength gain dependence of an amplifying fibre based on single ions is compensated by wavelength absorption dependence of an absorbing fibre based on cluster ions, and (ii) gain intensity dependence of the amplifying fibre is compensated by the absorption intensity dependence of the absorbing fibre. The first condition is met by selecting suitable and different co-dopants for both fibres. The second condition is met by selecting suitable parameters for both fibres (numerical aperture, NA, fibre core, a, fibre length, L, ion concentration, N, cluster size, m).

Figure 7:
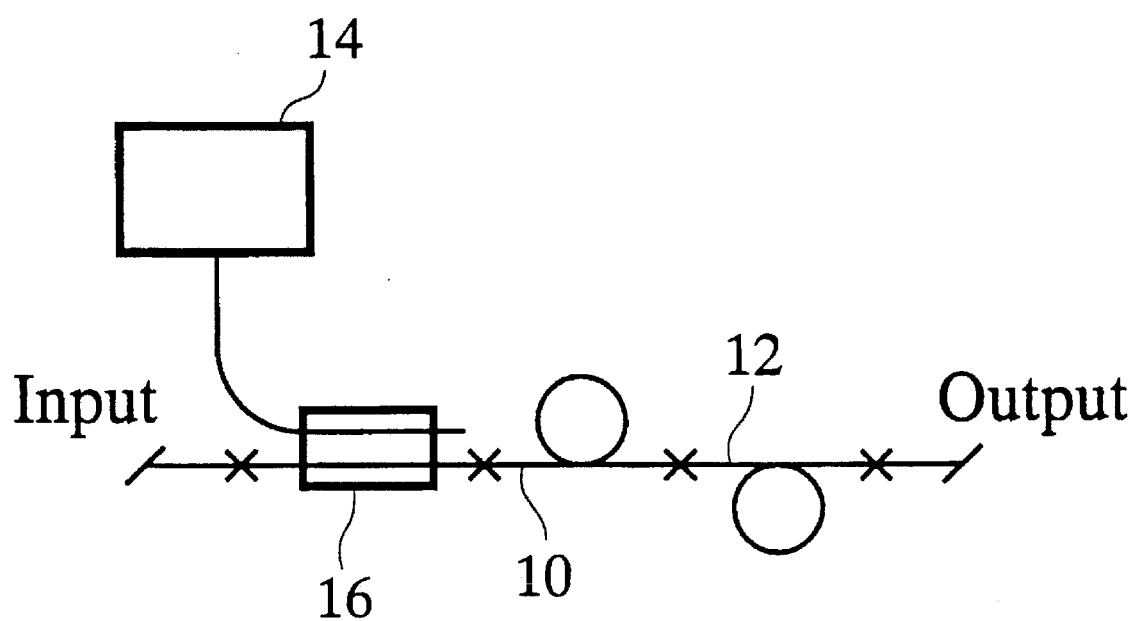
FIG. 7 is a circuit diagram of an erbium doped optical fibre amplifier coupled to a non-saturable absorbing fibre having heavily clustered ions, which behaves as a passive fixed absorption filter in accordance with an aspect of the invention.

Referring now to FIG. 7, a basic amplifying system in accordance with this invention is shown. A pumped erbium doped fibre 10, consisting of unclustered single ions, is provided for signal amplification; a second, unpumped NSAF 12, with heavily clustered ions, provides absorption. Both fibres coupled by a coupling means 16 are of different type having different absorption/emission spectral characteristics. The first fibre 10 is heavily pumped by a pump source 14, so that most of the ions are in the excited state; the second fibre 12 is so heavily doped that all the ions reside in large clusters and most of them are in the ground state. Due to the large clusters the absorption of the second fibre 12 does not change with the light intensity (see FIG. 3 for m=20), and this configuration is equivalent to the one with an all-fibre passive filter. Very heavy clustering in the second fibre 12 also allows the pump beam to propagate through the fibre without inducing bleaching (refer to FIG. 4 for m=20).

Figure 8:
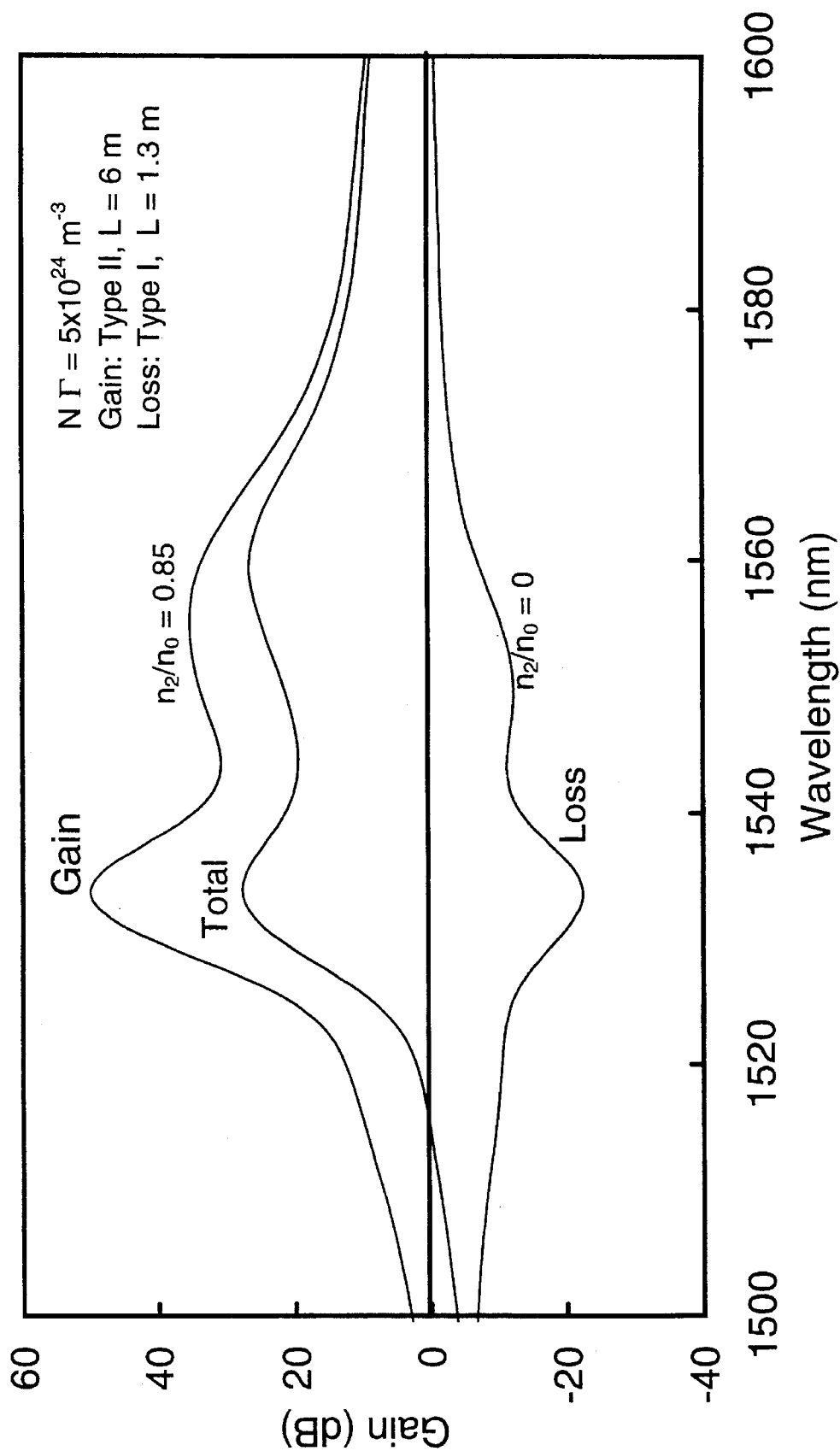
FIG. 8 is a graph of gain versus wavelength, depicting small-signal gain for a type II fibre and loss for a type I optical fibre in accordance with the invention.

The gain characteristics of the optical fibre system of FIG. 7 are shown in FIG. 8. The gain curve depicts amplification in the first fibre 10. The loss curve shows non-saturable absorption properties of the second fibre 12. The graph indicates that significant spectral flattening of the total gain is obtained. Residual spectral gain variations are dependent on the particular spectral properties of fibres used for the gain and loss sections 10 and 12, respectively. Of course, if care is taken to suitably match or optimize the particular optical fibres 10 and 12 selected, gain flattening can be further improved. Optimization of gain flattening can be obtained by using different concentrations of the co-dopants, or different co-dopants in both optical fibres 10 and 12. The gain flattened amplifier shown in FIG. 7 uses two types of fibres. For amplification (m=1) 6 m long Type II fibre is used; for non-saturable absorption (m=20) 1.3 m long Type I fibre is employed. These fibres are chosen by way of example to illustrate the principle of the invention. Conveniently, the type of gain equalization of this invention is fibre compatible and offers intensity independent gain equalization. This type of gain equalization is particularly suitable in applications such as optical preamplifiers, where typically, input signals have a particularly small intensity and do not saturate the amplifier.

Figure 9A:
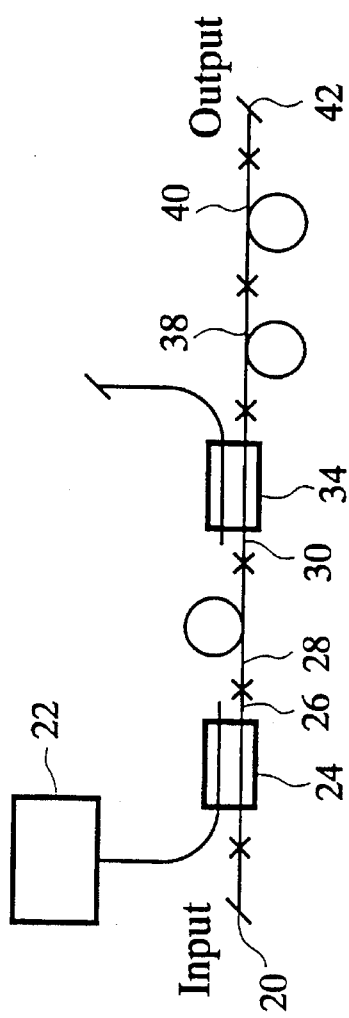
FIG. 9a is a circuit diagram of an erbium doped optical fibre amplifier for providing gain equalization in accordance with the invention.
Figure 9B:
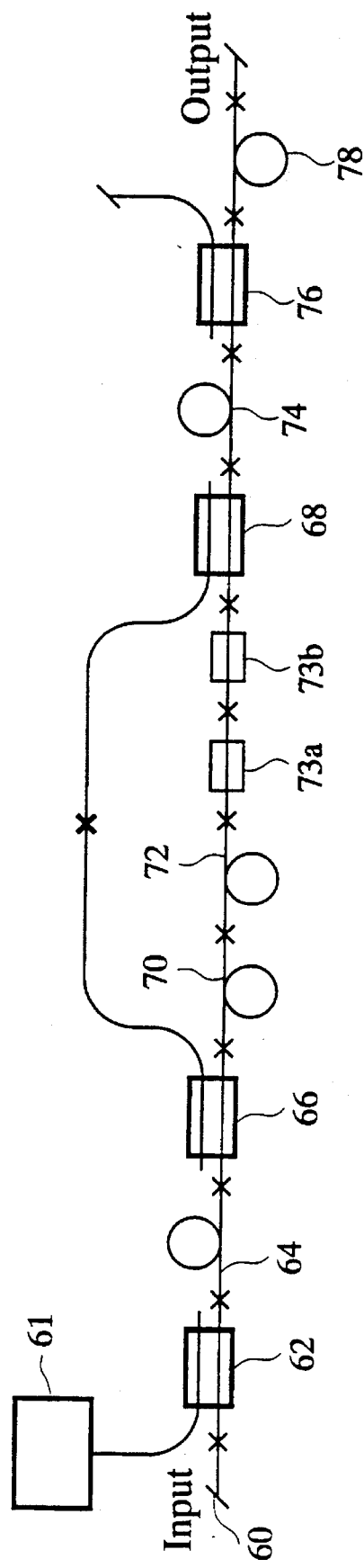
FIG. 9b is a circuit diagram of another embodiment of an optical fibre amplifier for providing gain equalization in accordance with the invention.

Referring now, to FIGS. 9a and 9b, more complex and practical implementations of amplifiers are shown. In FIG. 9a, an input optical fibre 20 is coupled to a pump source 22 with a first wavelength division multiplexor (WDM) 24. An end of an erbium doped optical fibre (EDF) 28 is connected to an output fibre 26 of the first WDM 24. The other end of the EDF 28 is coupled to an input fibre 30 of a second WDM 34. First and second serially coupled non-saturable absorbing optical fibres 38 and 40 are connected between the second WDM 34 and an output terminal 42. In the amplifiers shown in both FIG. 9a and FIG. 9b, the residual pump light is filtered by the second wavelength division multiplexor 34 and does not enter the sections of fibre 38 and 40 with clustered ions. Removing the pump light accompanying the amplified signal before the non-saturable absorbing fibre 38 prevents the NSAF fibre 38 from bleaching due to the pump signal intensity.

In FIG. 9b, a multi-stage or cascaded amplifying circuit is shown. A WDM 62 couples a pump signal, provided by a pump 61, at a wavelength of 980 nm with an input signal provided on an input terminal 60. As the input signal propagates through an erbium doped fiber 64 it is amplified. A second WDM 66 removes any remaining pump signal at the pump wavelength of 980 nm and provides this pump signal to a third WDM 68 for coupling downstream in the circuit. Two NSAFs 70 and 72 with suitably selected parameters (numerical aperture, NA, fibre core, a, fibre length, L, ion concentration, N, cluster size, m), receive the amplified input signal and provide controlled non-saturable absorption of particular wavelengths. Further controlled signal gain is obtained by cascading a circuit similar to the one shown in FIG. 7 to the output of the WDM 68. As is shown, an erbium doped fiber 74 receives a pump signal and amplified input signal from the WDM 68 which is further amplified by the EDF 74. Similarly, as in FIG. 7, a WDM 76 removes any remaining pump signal; Particular wavelengths of the twice amplified signal are absorbed in a controlled manner by a third NSAF 78.

Intensity independent spectral shaping of the amplified signal in FIG. 9b may be performed with an optional absorption bandpass filter 73a, for the provision of spectrally narrow optical signal channels. An optical isolator 73b may also be provided as shown to improve upon by lessening the noise characteristics of the circuit. Placing a bandpass filter and isolator between two WDMs is a commonly used technique in high-gain low-noise preamplifiers. Thus, the introduction of the NSAFs in to the EDFA would not require any additional optical elements.

Figure 10B:
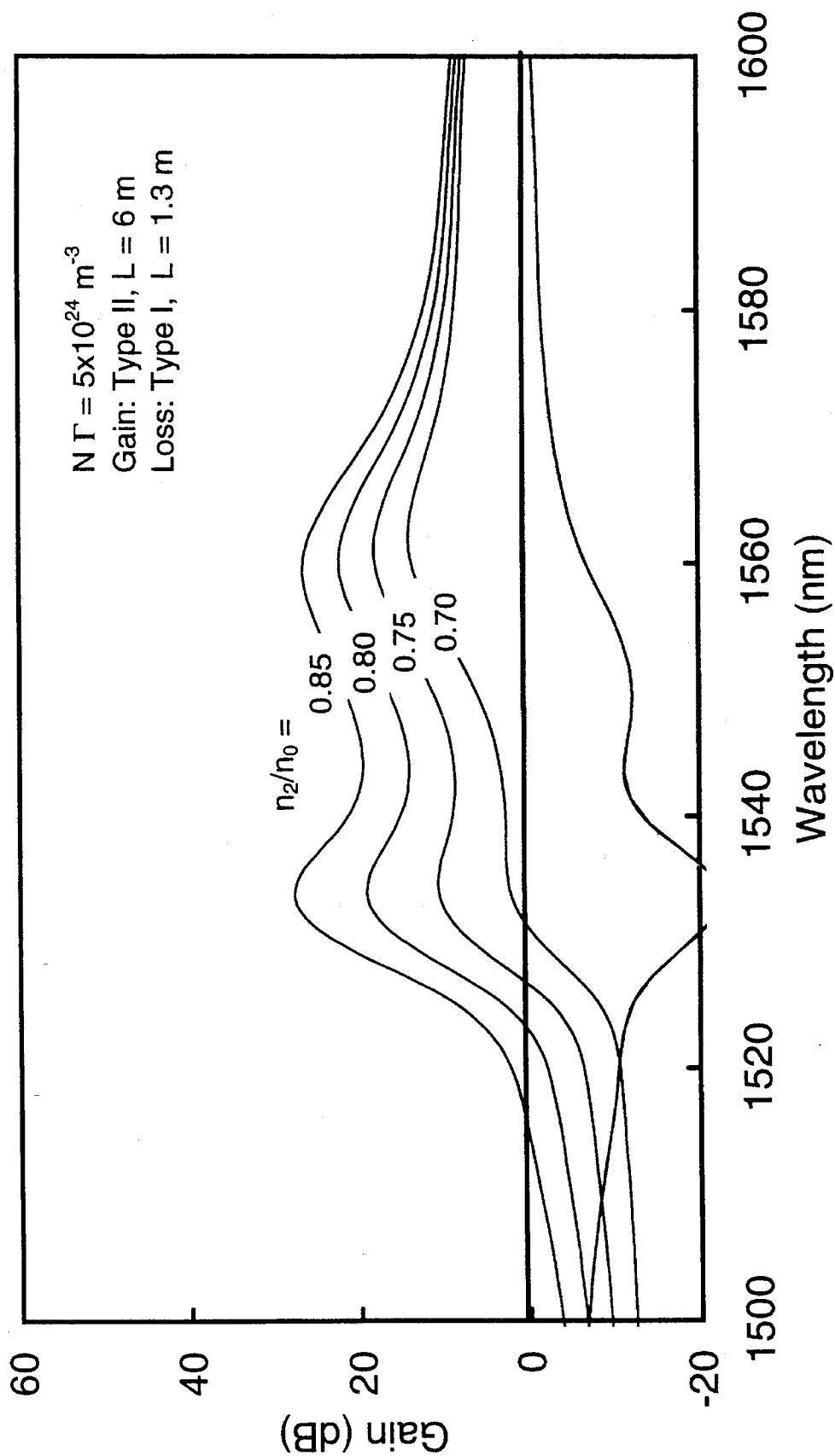
Figure 11A:
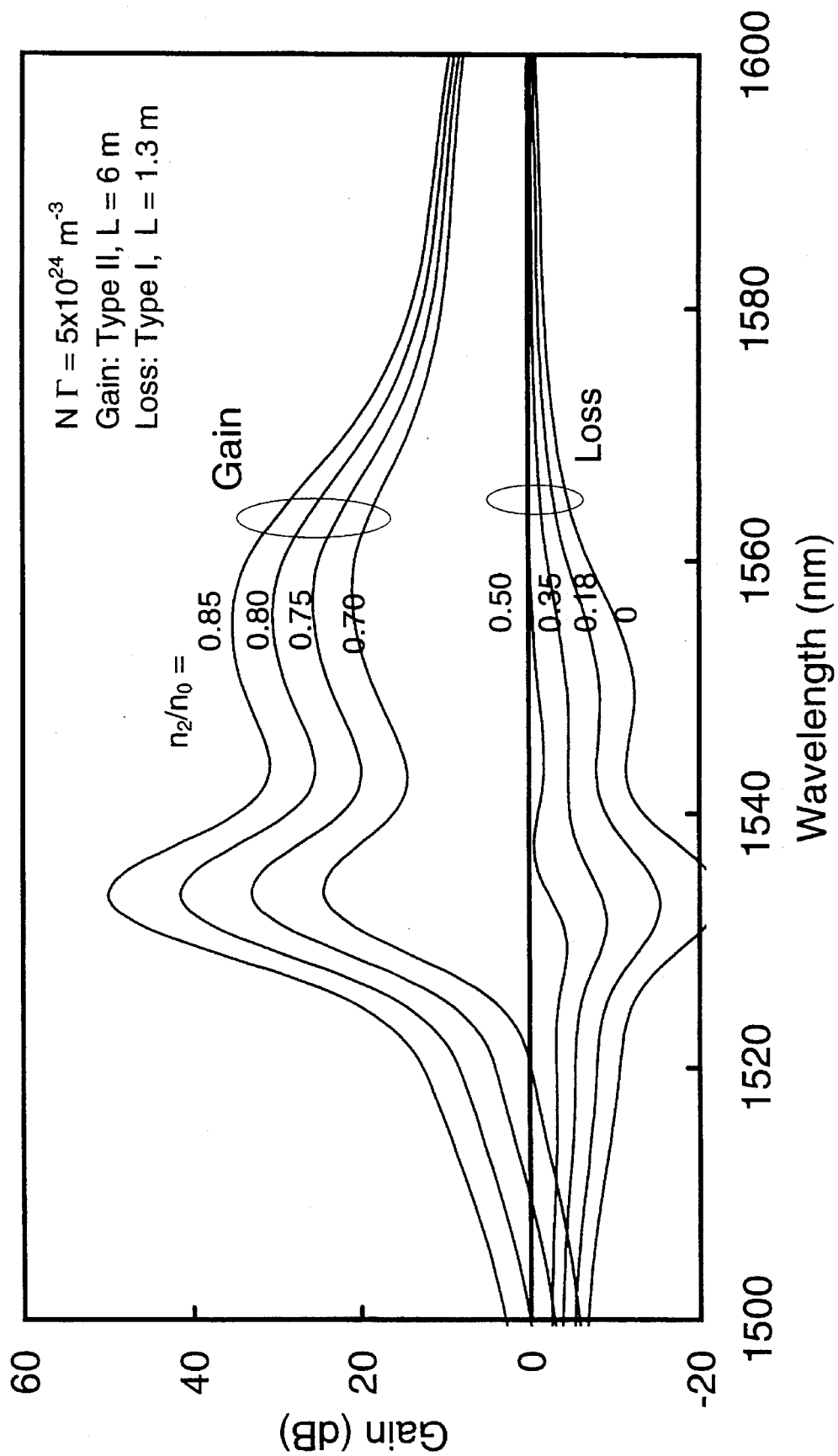
Figure 11:
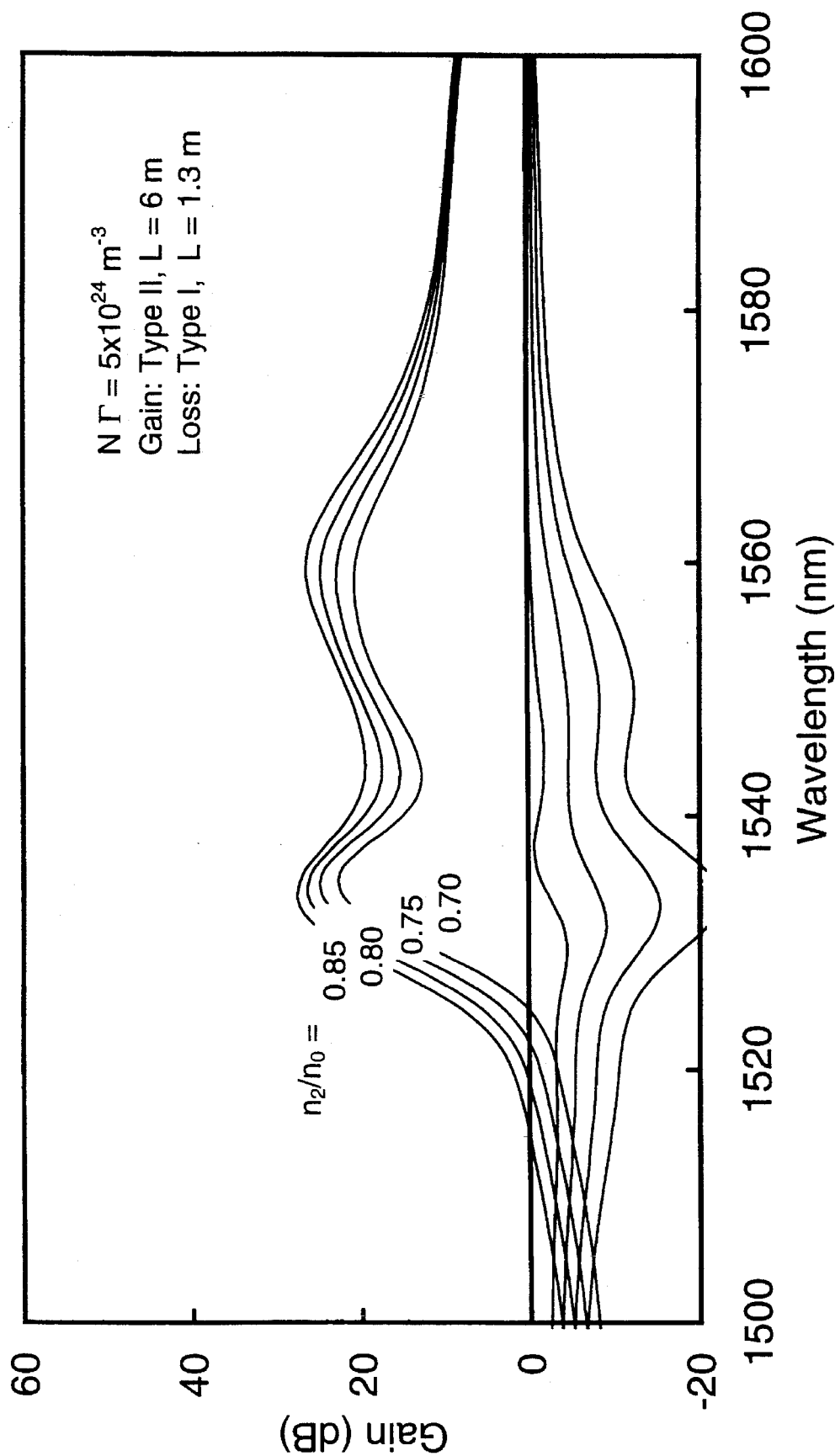

The gain equalization presented in FIG. 8 is optimized for an amplifier operating with a population inversion $n_2/n_0=0.85$. An optical fibre with heavily clustered ions (m=20), used for absorption, functions like a bulk absorption filter providing a constant signal/pump intensity independent loss. However, the gain characteristics of an amplifying fibre are strongly dependent on input light intensity. This gain dependence on population inversion is shown in FIG. 10a (repeated from FIG. 6). The population inversions correspond to weak input signal power and to a variable pump power of about: 100 mW resulting $n_2/n_0=0.85$; 25 mW for $n_2/n_0=0.70$. The 0.70 value of population inversion can also be attained for strong pumping (100 mW) with enough input signal power to saturate the amplifier. Spectral variations in gain characteristics of an amplifying section of erbium doped fibre for different population inversions are significant. When gain is compensated by the intensity independent absorbing section of NSAF the resulting total gain, shown in FIG. 10b, is equalized for one particular value of population inversion, $n_2/n_0=0.85$. This feature is a common drawback of designs based on intensity independent absorption. However, this can be obviated by selecting a suitable level of clustering in the absorbing fibre. The shape of the absorption saturation characteristics of the fibre having clusters can be controlled by selecting suitable fibre geometry and clustering level, for instance m<20 (see FIGS. 2,3,4). If the gain saturation properties of an amplifying fibre (gain reduction at higher signal output powers) is correctly compensated by the absorption saturation properties of the absorbing fibre (absorption reduction at higher signal input power), the reduction of gain in an EDF can be matched to the reduction of loss in the non-saturable absorbing fibre. The example illustrating the performance of simple two fibre systems (see FIG. 7) is shown in FIG. 11. The peak gain of the EDF in FIG. 11a changes from about 50 dB to 25 dB for different population inversions (the same result as presented in FIG. 6). Simultaneously, the peak absorption of the NSAF changes from −25 dB to −5 dB. The resulting total gain of the system shown in FIG. 11b is almost independent on the amplifier population inversion (or the input signal power) and on the signal wavelength.

The detailed discussion presented above focuses on the absorption/emission aspects of the invention. The absorption/emission properties of the medium are however directly related to its dispersion properties and vice versa. Therefore, the described method of controlling absorption and amplification is directly applicable to the applications in which dispersion control is required.

In summary, this invention provides a method and a device for controlling gain and dispersion of an amplified signal by incorporating one or several pieces of non-saturable absorbing fibre into a standard EDFA. Non-saturable absorbing fibres act as the gain equalizing absorber, designed in such a way, that its absorption spectral characteristics may stay constant or may adapt to the changes in the EDFA gain profile. A second associated effect of the device described heretofore, is the possibility of controlling signal dispersion within the fibre. Thus, by using non-saturable absorbing rare-earth doped fibre with a compatible standard rare-earth doped optical fibre the intensity and phase of transmitted light can be modified in a controlled manner according to the requirements of a system.

The use of a NSAF as a spectral absorption filter allows one to design an absorber that will absorb according to required spectral and intensity saturation characteristics for EDFA gain equalization. The designed absorber characteristics should complement the spectral properties of the gain medium, including flattening of absorption spectrum with spectral flattening of EDFA saturated gain. The use of a NSAF as a spectral dispersion element allows the enhancement or reduction in dispersion within the fibre in a given frequency band to compensate for dispersion in other elements of the fibre link.

Although in the examples given, an erbium doped fibre amplifier has been coupled with a NSAF heavily doped with erbium, variations may be envisaged. For example, the clustered NSAF may be heavily doped with rare-earth ions, wherein each cluster only includes one erbium ion surrounded by other rare-earth ions, or each large cluster may include only a couple or few ions of the same rare-earth that the complementary rare-earth amplifier is doped with.

In conclusion, the method of fibre amplifier gain and or dispersion equalization through the use of NSAF is characterized by the following features:

(i) The level of small-signal absorption, non-saturable absorption and saturation power, and the shape of the absorption/emission spectrum of particular doped fibre or NSAF can be designed for particular requirements by varying fibre doping concentrations (Er,Ge,Al,P, etc.), fibre geometry (length, core dia., NA, etc.), and degree of ion clustering.

(ii) Each of the NSAFs inserted into an fibre amplifier can be unpumped or partially pumped to obtain required spectral absorption/dispersion characteristics.

(iii) Non-saturable absorbing fibres can be inserted internally into the amplifier and/or at its input and/or output.

(iv) Several NSAFs with various small-signal absorptions, non-saturable absorptions, saturation powers, absorption spectrum shapes, and pumping powers can be used in a single fibre amplifier. Proper adjustment of the set of parameters (listed in (i)) for each NSAF, separately allows one to design for particular saturation, dispersion and spectral properties of the NSAF absorber.

(v) Non-saturable absorbing fibres may be used in conjunction with isolators and bandpass filters (at signal wavelengths) inserted internally in to the amplifier (isolators and bandpass filters are used commonly in high-gain low-noise preamplifiers (see FIG. 9b).

(vi) The NSAF can be introduced into fibre lasers as a means of changing the dispersion within a laser cavity for controlling chirp of ultra short optical pulses.

The method of fibre amplifier gain equalization through the use of NSAF provides optical fibre compatibility, low cost. It is envisaged that this invention will be especially useful in the areas of WDM all-optical fibre networks; "smart-skins" with multiple sensors being interrogated at different wavelengths; distributed sensor arrays along a single fibre, where such element would compensate different spectral characteristics of the already fabricated array; and, in mode-locked fibre lasers.

Of course other embodiments may be envisaged without departing from the spirit and scope of the invention.

What we claim is:

1. An optical fibre amplifier comprising an optical fibre having a core being doped with ions of a rare-earth laser light emission doping substance having a concentration of less than $20 \times 10^{24}$ ions/m$^3$, most of the ions being sufficiently spaced apart so that the ions will produce amplification of an input signal at predetermined wavelengths upon excitation by an energy source, the optical fibre core also being doped with ions some of which are of the same rare-earth in a concentration substantially greater than $50 \times 10^{24}$ ions/m$^3$, these ions being clustered and spaced so near to one another as to effect non-saturable absorption and attenuation of at least part of the input signal.

2. An optical device comprising an optical fibre, a portion along its length being doped with ions of a rare-earth having a first concentration of less than a predetermined number of ions/m$^3$, most of the ions being sufficiently spaced apart so that the ions will produce amplification of an input signal at predetermined wavelengths upon excitation by an energy source, the optical fibre having another portion along its length being doped with ions, some of which are of the same rare-earth in a concentration substantially greater than the first concentration, the ions being clustered such that each cluster contains at least one ion of the same rare-earth, the clustered ions being spaced so near to one another as to effect non-saturable absorption and attenuation of at least part of the amplified signal.

3. An optical device comprising:
   a first optical waveguide being doped with ions of a rare-earth for providing amplification with an efficiency close to quantum limits, a plurality of the rare-earth ions being spaced apart from each other so that the ions will produce amplification of an input signal at predetermined wavelengths when excited by an energy source; and
   a second optical waveguide coupled with the first optical waveguide, the second optical waveguide being more heavily doped than the first optical waveguide with ions, some of which are of the same rare-earth, some of the ions being spaced closer together in clusters or pairs so that they are spaced so near to one another as to effect non-saturable absorption and attenuation of at least part of the amplified signal.

4. The optical device as defined in claim 3, wherein the concentration of doped rare-earth ions in the first optical waveguide is less than $20 \times 10^{24}$ ions/m$^3$, and where the concentration of ions in the second optical waveguide is at least $50 \times 10^{24}$ ions/m$^3$.

5. The optical device as defined in claim 3, wherein the optical waveguides are optical fibres.

6. The optical device as defined in claim 5, wherein the rare-earth is erbium.

7. The optical device as defined in claim 3, wherein the ratio of the concentration in the first and second fibres is less than 2:5.

8. The optical device as defined in claim 5, wherein at least one of the optical fibres includes germanium as a co-dopant.

9. The optical device as defined in claim 5, wherein rare-earth is erbium, and wherein the second optical fibre is doped with germanium.

10. The optical device as defined in claim 3, wherein the first optical waveguide includes a co-dopant of a first type and wherein the second optical waveguide includes a co-dopant of a second different type.

11. An optical device as defined in claim 3, wherein the energy source for amplification of the input signal is in the form of a pump signal having a second wavelength, the input signal having a first wavelength, the optical device comprising:
   a) means for substantially removing any remaining pump signal having the second wavelength from an output end of the first optical waveguide.

12. An optical device as defined in claim 3, wherein the clusters are formed of groups of more than 10 ions.

13. An optical device comprising waveguide means having a first portion and second portion, one of the first and second portions being comprised of a rare-earth doped optical fibre amplifier, and the other of the first and second portion being comprised of a rare-earth doped non-saturable absorbing optical fibre, wherein the first portion of the waveguide means comprises a doped optical fibre having a first type of glass matrix material surrounding single, unclustered rare-earth ions, and wherein the second portion of the waveguide comprises a second type of glass matrix material surrounding substantially clustered rare-earth ions.

14. The optical device as defined in claim 3, wherein each cluster or pair includes at least one ion of the same rare-earth.

15. The optical device as defined in claim 11 comprising a plurality of the amplifiers as defined in claim 11, wherein the amplifiers are cascaded.

16. The optical device as defined in claim 11, wherein the optical waveguides are optical fibres.

17. The optical device as defined in claim 3, wherein a ratio of the waveguide transmission expressed in decibels and measured at high input signal power, referred as non-saturable absorption due to the presence of clustered ions, to the waveguide transmission expressed in decibels and measured at low input signal power, referred to as small-signal absorption, is less than 1/30 in the first optical waveguide, greater than 1/30 in the second optical waveguide when the transmission is measured for an input signal at a predetermined wavelength.

18. An optical device as defined in claim 11, wherein the non-saturable absorbing waveguide comprises a mixture of single and clustered ions with the level of clustering sufficient to assure that a ratio of the waveguide transmission expressed in decibels and measured at high input signal power, referred to as non-saturable absorption due to the presence of clustered ions, to the waveguide transmission expressed in decibels and measured at low input signal power, referred to as small-signal absorption, is greater than 1/30, when the transmission is measured for an input signal at a predetermined wavelength.

* * * * *